Albin Warth's Impr'd in Taps.

4404

Reissued May 30 1871

Witnesses.

C. Wahlers.

Ernst Bilhuber.

Inventor.

Albin Warth per

Van Santvoord & Hauff,

Attys

UNITED STATES PATENT OFFICE.

ALBIN WARTH, OF STAPLETON, NEW YORK.

IMPROVEMENT IN TAPS FOR OIL-PACKAGES.

Specification forming part of Letters Patent No. 110,612, dated December 27, 1870; reissue No. 4,404, dated May 30, 1871.

DIVISION B.

*To all whom it may concern:*

Be it known that I, ALBIN WARTH, of Stapleton, in the county of Richmond and State of New York, have invented a new and useful Improvement in Taps for Oil-Packages; and I do hereby declare the following to be a full, clear, and exact description thereof, which will enable those skilled in the art to make and use the same, reference being had to the accompanying drawing forming part of this specification, in which drawing—

Figure 1:
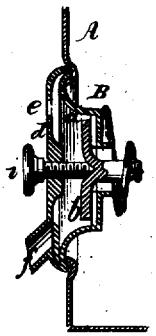
Figure 2:
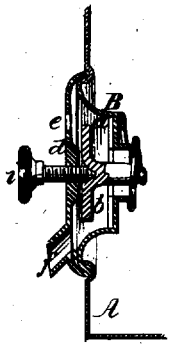

Figure 1 represents a central section of this invention when the tap is closed. Fig. 2 is a similar section of the same when the valve is open.

Similar letters indicate corresponding parts.

This invention consists in the combination of a flanged seat-plate, a valve-cap, and an inclosed valve working between said cap and the flanged seat-plate, and operated by a screw to fit upon the seat of the flanged plate, said screw being tapped in the valve-cap in such a manner that by turning the screw in the valve is firmly depressed on its seat and the tap is closed, and by turning the screw out the valve is free to open.

In the drawing, the letter A designates a package or can, to which my tap B is attached. This tap consists of a flanged plate, *a*, a portion of the outer surface of which forms a seat for the valve *b*, and which is perforated in its center to allow the liquid contents of the can or package to discharge when the tap is open, This valve is protected by a cap, *d*, which is raised sufficiently between the flanged seat-plate *a* to permit the valve to be opened, and which is provided with a vent-hole, *e*, and a discharge-opening, *f*. The valve-cap *d* is tapped to receive a screw, *i*, which, when turned in, acts on the valve and depresses the same upon its seat. When the screw is turned out, the pressure on the liquid, acting on the inner surface of the valve, forces the same off from its seat; but, if desired, a weak spring may be applied to the stem of the valve for the purpose of raising the same from its seat when the screw is turned back.

What I claim as new, and desire to secure by Letters Patent, is—

The combination of a flanged seat-plate, B, a valve-cap, *e*, and an inclosed valve, *b*, working between said cap and the flanged seat-plate, and acted on by a screw, *i*, which presses it down upon the seat of the flanged plate to close the opening therein, substantially as described.

ALBIN WARTH.

Witnesses:
W. HAUFF,
E. BILHUBER.